(12) United States Patent
Chaudhary

(10) Patent No.: US 10,308,829 B2
(45) Date of Patent: Jun. 4, 2019

(54) MOISTURE-AND PEROXIDE-CROSSLINKABLE POLYMERIC COMPOSITIONS

(71) Applicant: Dow Global Technologies LLC, Midland, MI (US)

(72) Inventor: Bharat I. Chaudhary, Princeton, NJ (US)

(73) Assignee: Dow Global Technologies LLC, Midland, MI (US)

( * ) Notice: Subject to any disclaimer, the term of this patent is extended or adjusted under 35 U.S.C. 154(b) by 177 days.

(21) Appl. No.: 15/028,967

(22) PCT Filed: Nov. 10, 2014

(86) PCT No.: PCT/US2014/064724
§ 371 (c)(1),
(2) Date: Apr. 13, 2016

(87) PCT Pub. No.: WO2015/077061
PCT Pub. Date: May 28, 2015

(65) Prior Publication Data
US 2016/0251535 A1  Sep. 1, 2016

Related U.S. Application Data

(60) Provisional application No. 61/908,245, filed on Nov. 25, 2013.

(51) Int. Cl.
*C09D 123/26* (2006.01)
*C08K 5/14* (2006.01)
*H01B 3/44* (2006.01)
*C08F 110/02* (2006.01)

(52) U.S. Cl.
CPC .......... *C09D 123/26* (2013.01); *C08F 110/02* (2013.01); *C08K 5/14* (2013.01); *H01B 3/441* (2013.01)

(58) Field of Classification Search
CPC ........ C09D 123/26; C08K 5/14; C08F 110/02
USPC ............................ 428/461; 521/143; 526/351
See application file for complete search history.

(56) References Cited

U.S. PATENT DOCUMENTS

| 3,646,155 | A | 2/1972 | Scott |
| 4,117,195 | A | 9/1978 | Swarbrick et al. |
| 4,252,906 | A | 2/1981 | Hosokawa et al. |
| 4,550,056 | A | 10/1985 | Pickwell et al. |
| 5,237,014 | A | 8/1993 | Barnabeo |
| 5,639,818 | A | 6/1997 | Lee et al. |
| 6,048,935 | A | 4/2000 | Penfold et al. |
| 6,388,051 | B1 | 5/2002 | Jow et al. |
| 2005/0031813 | A1* | 2/2005 | Conrnette ........... B29C 47/0004 428/35.7 |
| 2010/0160471 | A1 | 6/2010 | Sengupta et al. |
| 2011/0009514 | A1* | 1/2011 | Chaudhary ............... C08F 8/00 521/143 |

FOREIGN PATENT DOCUMENTS

| EP | 0113259 | 7/1984 |
| GB | 1234034 | 6/1971 |
| WO | 2009056408 | 5/2009 |
| WO | 2009056409 | 5/2009 |
| WO | 2011034836 A1 | 3/2011 |
| WO | 2011160964 | 12/2011 |

OTHER PUBLICATIONS

International Search Report and Written Opinion for PCT/US2014/064724, dated Jan. 2015, pp. 1-7.
International Preliminary Report on Patentability for PCT/US2014/064724, dated May 2016, pp. 1-5.

* cited by examiner

*Primary Examiner* — Doris L Lee

(57) ABSTRACT

Crosslinkable polymeric compositions comprising a polyolefin having hydrolyzable silane groups, an organic peroxide, and optionally a silanol condensation catalyst. Such crosslinkable polymeric compositions are crosslinkable via a combination of peroxide crosslinking and moisture curing. Such crosslinkable polymeric compositions can be employed in the production of various articles of manufacture, such as coated conductors.

8 Claims, 2 Drawing Sheets

US 10,308,829 B2

MOISTURE- AND PEROXIDE-CROSSLINKABLE POLYMERIC COMPOSITIONS

REFERENCE TO RELATED APPLICATIONS

The present application claims the benefit of U.S. Provisional Application No. 61/908,245, filed on Nov. 25, 2013.

FIELD

Various embodiments of the present invention relate to polymeric compositions crosslinkable by combined moisture-cure and peroxide-crosslinking techniques.

INTRODUCTION

In the fabrication of articles prepared from crosslinked polymers (such as cables, pipes, footwear, foams, etc.), polymeric compositions containing dialkyl peroxides can be melt mixed (at temperatures around 140° C., in the case of low-density polyethylene) and subsequently crosslinked by heating to higher temperatures (typically greater than 180° C. for polyethylene) in a mold, autoclave, or continuous vulcanization tube to complete decomposition of the peroxide. In such processes, minimization of "scorch" (premature crosslinking) during melt mixing (e.g., extrusion) is desired while still achieving sufficiently high degree of ultimate crosslinking. Although advances have been made in the art of crosslinked polymers, improvements are still desired.

SUMMARY

One embodiment is a crosslinkable polymeric composition, comprising:
(a) a polyolefin having hydrolyzable silane groups;
(b) an organic peroxide; and
(c) optionally, a silanol condensation catalyst.

Another embodiment is a process for producing a crosslinked polymeric composition, said process comprising:
(1) forming a crosslinkable polymeric composition comprising (a) a polyolefin having hydrolyzable silane groups, (b) an organic peroxide, and (c) optionally, a silanol condensation catalyst;
(2) subjecting said crosslinkable polymeric composition to conditions sufficient to induce crosslinking in at least a portion of said crosslinkable polymeric composition via said organic peroxide; and
(3) subjecting said crosslinkable polymeric composition to conditions sufficient to induce crosslinking in at least a portion of said crosslinkable polymeric composition via said hydrolyzable silane groups and optionally said silanol condensation catalyst,
thereby producing said crosslinked polymeric composition.

BRIEF DESCRIPTION OF THE DRAWINGS

Reference is made to the accompanying drawings in which.

DETAILED DESCRIPTION

Figure 1:
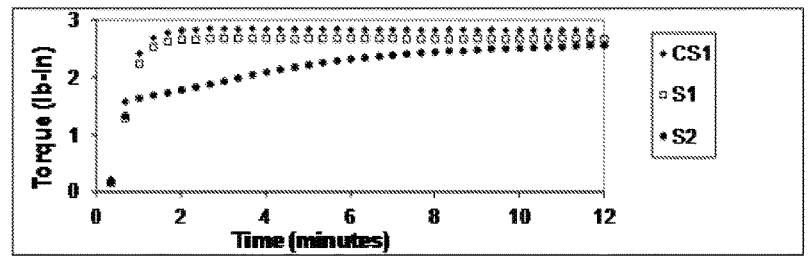
FIG. 1 is a plot of torque versus time for crosslinking of comparative sample CS1, and Samples S1 and S2 in a moving die rheometer ("MDR") at 200° C.

Various embodiments of the present invention concern crosslinkable polymeric compositions comprising (a) a polyolefin having hydrolyzable silane groups, (b) an organic peroxide, and (c) optionally, a silanol condensation catalyst. Further embodiments concern crosslinked polymeric compositions made from such crosslinkable polymeric compositions, methods for making such crosslinked polymeric compositions, and articles of manufacture comprising such crosslinked polymeric compositions.

Polyolefin

As just noted, the crosslinkable polymeric compositions described herein comprise a polyolefin having hydrolyzable silane groups. The polyolefin having hydrolyzable silane groups include silane-functionalized olefinic polymers such as silane-functionalized polyethylene, polypropylene, etc., and various blends of these polymers. In one or more embodiments, the silane-functionalized olefinic polymers can be selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, the interpolymer having a hydrolyzable silane grafted to its backbone. Exemplary α-olefins include propylene, 1-butene, 1-hexene, 4-methyl-1-pentene and 1-octene. Exemplary unsaturated esters are vinyl acetate or an acrylic or methacrylic ester.

Polyethylene, as used herein, is a homopolymer of ethylene or an interpolymer of ethylene and a minor amount (i.e., less than 50 mole percent ("mol %")) of one or more α-olefins and/or unsaturated esters having from 3 to 20 carbon atoms, or from 4 to 12 carbon atoms, and, optionally, a diene. Polyethylenes can also be a mixture or blend of such homopolymers and interpolymers. When a mixture is used, the mixture can be either an in situ blend or a post-reactor (e.g., mechanical) blend.

The polyethylene can be homogeneous or heterogeneous. Homogeneous polyethylenes typically have a polydispersity (Mw/Mn) of about 1.5 to about 3.5, an essentially uniform comonomer distribution, and a single, relatively low melting point as measured by differential scanning calorimetry. The heterogeneous polyethylenes typically have a polydispersity greater than 3.5 and lack a uniform comonomer distribution. Mw is weight-average molecular weight, and Mn is number-average molecular weight.

Polyolefins (e.g., polyethylenes) suitable for use herein can have a density in the range of from 0.850 to 0.970 g/cm$^3$, or from 0.870 to 0.930 g/cm$^3$. Polymer densities provided herein are determined according to ASTM International ("ASTM") method D792. In various embodiments, the polyolefins (e.g., polyethylenes) can have a melt index ($I_2$) in the range of from 0.01 to 2000, from 0.05 to 1000, or from 0.10 to 50 g/10 min. Melt indices provided herein are determined according to ASTM method D1238. Unless otherwise noted, melt indices are determined at 190° C. and 2.16 Kg (a.k.a., $I_2$). If polyethylene homopolymer is employed, then its $I_2$ can be from 0.1 to 10 g/10 min.

Polyethylenes used in the practice of this invention can be prepared by any known or hereafter discovered process (such as high-pressure, solution, slurry, or gas-phase) using any conventional or hereafter discovered conditions and techniques. Catalyst systems include Ziegler-Natta, Phillips, and the various single-site catalysts (e.g., metallocene, constrained geometry, etc.). The catalysts can be used with or without supports.

Useful polyethylenes include low density homopolymers of ethylene made by high-pressure processes (HP-LDPEs), linear-low-density polyethylenes (LLDPEs), very-low-density polyethylenes (VLDPEs), ultra-low-density polyethylenes (ULDPEs), medium-density polyethylenes (MDPEs), high-density polyethylene (HDPE), and metallocene and constrained-geometry copolymers.

High-pressure processes are typically free-radical-initiated polymerizations and conducted in a tubular reactor or a stirred autoclave. In a tubular reactor, the pressure can be in the range of from 25,000 to 45,000 psi, and the temperature can be in the range of from 200 to 350° C. In a stirred autoclave, the pressure can be in the range of from 10,000 to 30,000 psi, and the temperature can be in the range of from 175 to 250° C.

Interpolymers comprised of ethylene and unsaturated esters are well known and can be prepared by conventional high-pressure techniques. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. The portion of the interpolymer attributed to the ester comonomer can be in the range of from 5 to less than 50 weight percent ("wt %") based on the weight of the interpolymer, or in the range of 15 to 40 wt %.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate. The melt index of ethylene/unsaturated ester interpolymers can be in the range of from 0.5 to 50 g/10 min, or in the range of from 2 to 25 g/10 min.

Interpolymers of ethylene and unsaturated silane monomers (e.g., vinyl silanes) may also be used. Interpolymers of ethylene, unsaturated esters and unsaturated silane monomers (e.g., vinyl silanes) may also be used. Such polymers are typically made using a high-pressure process. Ethylene-vinylsilane copolymers and terpolymers with unsaturated esters are particularly well suited for moisture-initiated crosslinking.

VLDPEs and ULDPEs are typically copolymers of ethylene and one or more α-olefins having 3 to 12 carbon atoms, or 3 to 8 carbon atoms. The density of the VLDPE or ULDPE can be in the range of from 0.870 to 0.915 g/cm³. The melt index of the VLDPE or ULDPE can be in the range of from 0.1 to 20 g/10 min, or from 0.3 to 5 g/10 min. The portion of the VLDPE or ULDPE attributed to the comonomer(s), other than ethylene, can be in the range of from 1 to 49 wt % based on the weight of the copolymer, or from 15 to 40 wt %.

A third comonomer can be included, e.g., another α-olefin or a diene such as ethylidene norbornene, butadiene, 1,4-hexadiene or a dicyclopentadiene. Ethylene/propylene copolymers are generally referred to as EPRs, and ethylene/propylene/diene terpolymers are generally referred to as EPDMs. The third comonomer can be present in an amount of from 1 to 15 wt % based on the weight of the interpolymer, or from 1 to 10 wt %. In various embodiments, the interpolymer can contain two or three monomer types, inclusive of ethylene.

The LLDPE can include VLDPE, ULDPE, and MDPE, which are also linear, but, generally, have a density in the range of from 0.916 to 0.925 g/cm³. The LLDPE can be a copolymer of ethylene and one or more α-olefins having from 3 to 12 carbon atoms, or from 3 to 8 carbon atoms. The melt index can be in the range of from 1 to 20 g/10 min., or from 3 to 8 g/10 min.

Any polypropylene may be used in these compositions. Examples include homopolymers of propylene, copolymers of propylene and other olefins, and terpolymers of propylene, ethylene, and dienes (e.g. norbornadiene and decadiene). Additionally, the polypropylenes may be dispersed or blended with other polymers, such as EPR or EPDM. Suitable polypropylenes include thermoplastic elastomers (TPEs), thermoplastic olefins (TPOs) and thermoplastic vulcanates (TPVs). Examples of polypropylenes are described in *Polypropylene Handbook: Polymerization, Characterization, Properties, Processing, Applications,* 3-14, 113-176 (E. Moore, Jr. ed., 1996).

Hydrolyzable silane monomers suitable for use in forming the silane-functionalized polyolefin can be any hydrolyzable silane monomer that will effectively copolymerize with an olefin (e.g., ethylene), or graft to and crosslink an olefin (e.g., ethylene) polymer. Those described by the following formula are exemplary:

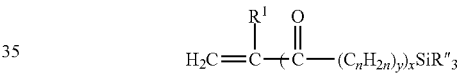

in which $R^1$ is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than one of the three R" groups is an alkyl. Such silanes may be copolymerized with ethylene in a reactor, such as a high-pressure process. Such silanes may also be grafted to a suitable ethylene polymer by the use of a suitable quantity of organic peroxide. Suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Suitable hydrolyzable silane monomers include, but are not limited to, vinyltrimethoxysilane ("VTMS"), vinyltriethoxysilane ("VTES"), vinyltriacetoxysilane, and gamma-(meth)acryloxy propyl trimethoxy silane.

Incorporation of the hydrolyzable silane group in the polyolefin can be accomplished using any known or hereafter discovered copolymerization or grafting techniques. By way of example, the hydrolyzable silane monomer can be grafted onto a polyolefin by combining a polyolefin with an unsaturated alkoxysilane (e.g., vinyltrimethoxysilane) and a peroxide (e.g., dicumyl peroxide ("DCP")). After mixing for a period of time (e.g., 1-30 minutes), the mixture can be extruded at elevated and increasing temperatures (e.g., from 160° C. to 220° C.). Whether copolymerizing or grafting, the amount of unsaturated hydrolyzable silane monomer employed in the reaction can range from 0.5 to 10 wt %, from 1 to 5 wt %, or from 1 to 3 wt % based on the combined weight of the polyolefin and the unsaturated hydrolyzable silane monomer. In an embodiment, the hydrolyzable silane group can be melt-blended with the polyolefin, peroxide and other ingredients in one step as part of the cable extrusion process, without a need to first prepare a compound or grafted polyolefin prior to use during cable extrusion.

An example of a commercially available polyolefin having hydrolyzable silane groups is SI-LINK™ DFDA-6451, which is ethylene copolymerized with 1.5 wt % vinyltrimethoxysilane prepared using a high-pressure reactor, and is available from The Dow Chemical Co., Midland, Mich., USA.

The polyolefin can also comprise blends of silane-functionalized olefinic polymer with one or more other polyolefins that are not silane functionalized.

In various embodiments, the polyolefin having hydrolyzable silane groups can be present in the crosslinkable polymeric composition in an amount of at least 30 wt %, at least 50 wt %, at least 70 wt %, at least 90 wt %, or at least 96 wt %, based on the combined weight of the polyolefin, the organic peroxide, and the silanol condensation catalyst (if present). In some embodiments, the polyolefin having hydrolyzable silane groups can be present in an amount ranging from 96 to 99.49 wt %, based on the combined weight of the polyolefin, the organic peroxide, and the silanol condensation catalyst (if present).

Organic Peroxide

As noted above, the crosslinkable polymeric composition comprises an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, the term "hydrocarbyl" denotes a univalent group formed by removing a hydrogen atom from a hydrocarbon (e.g. ethyl, phenyl). As used herein, the term "hydrocarbylene" denotes a divalent group formed by removing two hydrogen atoms from a hydrocarbon. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms, or any two of R, $R^1$, and $R^2$ can have the same number of carbon atoms while the third has a different number of carbon atoms.

Exemplary organic peroxides include dicumyl peroxide ("DCP"); tert-butyl peroxybenzoate; di-tert-amyl peroxide ("DTAP"); bis(t-butyl-peroxy isopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; butyl 4,4-di(tert-butylperoxy)valerate; di(isopropylcumyl) peroxide; and mixtures of two or more thereof. In various embodiments, only a single type of organic peroxide is employed. In an embodiment, the organic peroxide is dicumyl peroxide.

In various embodiments, the organic peroxide can be present in an amount of at least 0.5 wt %, at least 0.75 wt %, or at least 1 wt %, based on the combined weight of the polyolefin, the organic peroxide, and the silanol condensation catalyst (if present). In some embodiments, the organic peroxide can be present in an amount ranging from 0.5 to 3 wt %, based on the combined weight of the polyolefin, the organic peroxide, and the silanol condensation catalyst (if present).

Silanol Condensation Catalyst

As noted above, the crosslinkable polymeric composition may optionally further comprise a silanol condensation catalyst. The silanol condensation catalyst can be any known or hereafter discovered compound that acts as a moisture-cure catalyst, including Lewis and Brønsted acids or bases. In one or more embodiments, the silanol condensation catalyst is an acid.

Lewis acids are chemical species (molecule or ion) that can accept an electron pair from a Lewis base. Lewis bases are chemical species (molecule or ion) that can donate an electron pair to a Lewis acid. Lewis acids that can be used in the practice of this invention include tin carboxylates, such as dibutyl tin dilaurate ("DBTDL"), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this invention include, but are not limited to, primary, secondary and tertiary amines.

Brønsted acids are chemical species (molecule or ion) that can lose or donate a hydrogen ion (proton) to a Brønsted base. Brønsted bases are chemical species (molecule or ion) that can gain or accept a hydrogen ion from a Brønsted acid. In various embodiments, the silanol condensation catalyst can be a Brønsted acid. Examples of suitable Brønsted acid silanol condensation catalysts include, but are not limited to, monosulfonic acids and disulfonic acids. Sulfonic acids are organic acids that contain one or more sulfonic (i.e., —$SO_3H$) groups, and have the general formula RS($=$O)$_2$—OH, where R is an organic alkyl or aryl group and the S($=$O)$_2$—OH group is a sulfonyl hydroxide. Sulfonic acids can be aliphatic or aromatic and differ significantly in melting points. Examples of aromatic sulfonic acids are benzene sulfonic acid, alkyl benzene sulfonic acid, alkyl ethyl benzene sulfonic acid, alkyl toluene sulfonic acid, dodecylbenzenesulfonic acid, 4-methylbenzene sulfonic acid (also known as p-toluenesulfonic acid), alkyl xylene sulfonic acid, naphthalene sulfonic acid, alkyl napthalene sulfonic acid, and blocked sulfonic acids. Sulfonic acids include the silanol condensation catalysts disclosed in U.S. Pat. No. 8,460,770 B2.

In an embodiment, the silanol condensation catalyst can be a blocked sulfonic acid. Blocked sulfonic acids can be amine-blocked (which are ionic, charged species) or covalently-blocked (through reactions with alcohols, epoxies or functional polymers). Blocked sulfonic acids dissociate at elevated temperatures by hydrolysis, alcoholysis or decomposition reactions to generate free acids. The amine-deblocking mechanism is reversible, while deblocking of covalent-blocked acids is not reversible. More information on blocked sulfonic acids is presented in "Coatings Materials and Surface Coatings" (CRC Press, Nov. 7, 2006; edited by Arthur A. Tracton) and "Handbook of Coating Additives" (CRC Press, May 26, 2004; edited by John J. Florio, Daniel J. Miller). The NACURE™ materials (all products of King Industries) disclosed in US Patent Application Publication No. 2011/0171570 are examples of blocked sulfonic acids with varying dissociation temperatures. Examples of commercially available blocked sulfonic acids include NACURE™ 1419 (product of King Industries), which is a 30% solution of covalently-blocked dinonylnaphthalenesulfonic acid in xylene/4-methyl-2-pentanone, and NACURE™ 5414 (product of King Industries), which is a 25% solution of covalently-blocked dodecylbenzenesulfonic acid in xylene.

In various embodiments, a combination of two or more silanol condensation catalysts may be employed. For example, when a Brønsted acid silanol condensation catalyst is used, one or more other Lewis acid, Lewis base or Brønsted base silanol condensation catalysts may also be employed. For example, metal salts of carboxylic acids (e.g., dibutyltin dilaurate) and organic bases (e.g., pyridine) can be employed.

When employed, the silanol condensation catalyst can be present in an amount of at least 0.01 wt % or at least 0.02 wt %, based on the combined weight of the polyolefin, the organic peroxide, and the silanol condensation catalyst. In some embodiments, the silanol condensation catalyst can be present in an amount ranging from greater than 0 to 1.0 wt %, from 0.01 to 0.5 wt %, or from 0.02 to 0.2 wt %, based on the combined weight of the polyolefin, the organic peroxide, and the silanol condensation catalyst.

Additives

In various embodiments, the polymeric composition can comprise up to 5 parts per hundred of one or more additives selected from the group consisting of (but not limited to) cure boosters, scorch retardants, tree retardants (e.g., polyethylene glycol and polar polyolefin copolymers), heat and light stabilizers, fillers (e.g., carbon black or flame retardants), pigments, and antioxidants, based on 100 weight parts of the polyolefin.

Compounding and Fabrication

Compounding and melt blending of the crosslinkable polymeric composition can be effected by standard equipment known to those skilled in the art. Examples of compounding equipment are internal batch mixers, such as a BANBURY or BOLLING internal mixer. Alternatively, continuous single, or twin screw, mixers or extruders can be used, such as FARREL continuous mixer, a Werner and Pfleiderer twin screw mixer, or a Buss™ kneading continuous extruder. The crosslinkable polymeric composition can subsequently be fabricated, shaped, or molded into an end-use article by processes such as compression molding, injection molding, and extrusion through a die.

The components of the composition can be blended in any manner and using any equipment. Typically, the composition is melted blended using conventional mixing equipment, e.g., a BRABENDER batch mixer or extruder. The mixing or blending may be done at, below, or above the upper melting temperature (point) of the polyolefin, peroxide or silanol condensation catalyst. The peroxide, silanol condensation catalyst, hydrolyzable silane monomer and other additives can be added in any manner, including soaking and mixing, and in any order. In one embodiment, the additives are blended with one another and then added to the polyolefin. In one embodiment, the optional components are added individually. In one embodiment one or more of the optional components are added as a masterbatch to the polyolefin. Typically, the peroxide is the last component to be added to the polyolefin. In an embodiment, all the ingredients (including peroxide) are melt-blended in one step. In another embodiment, all the ingredients (including peroxide) are melt-blended in one step as part of the melt blending process, without a need to first prepare a compound prior to use during melt blending. The hydrolyzable silane monomer may be grafted to a suitable polyolefin by the use of a suitable quantity of organic peroxide, either before or during the article fabrication process, including (but not limited to) cable extrusion process.

In various embodiments, the polyolefin containing hydrolyzable silane groups can first be compounded with the organic peroxide. In such embodiments, the organic peroxide and polyolefin can be heated at elevated temperatures (e.g., about 60° C., or at least above the melting point of the organic peroxide) and mixed together. Thereafter, the peroxide-containing polyolefin can be combined with the silanol condensation catalyst and any desired additives and compounded at an elevated temperature (e.g., about 60° C., or at least above the melting point of the polyolefin). The resulting crosslinkable polymeric composition can be pelletized for later use in fabricating articles.

In alternate embodiments, a starting polyolefin that does not contain hydrolyzable silane groups can be employed. In such embodiments, the initial polyolefin can be combined with the organic peroxide in the same manner described immediately above. Next, an unsaturated silane monomer can be combined with the peroxide-containing polyolefin, along with the optional silanol condensation catalyst and any additives desired, and compounded at an elevated temperature (e.g., about 125° C. or 140° C.). In such embodiments, the hydrolyzable silane monomer is grafted onto the polyolefin in situ to form the polyolefin containing hydrolyzable silane groups. When this technique is employed, an excess of organic peroxide is used for silane monomer grafting; in this way, the excess peroxide is available for the crosslinking reaction of the crosslinkable polymeric composition at elevated temperatures. In various embodiments, at least 90 percent, preferably at least 93 percent, and most preferably at least 95 percent of the starting organic peroxide remains following the grafting reaction to be available for crosslinking reactions. Note that the amount of organic peroxide required to graft hydrolyzable silane monomers to polyolefins is generally much less than the amount of the unsaturated silane monomer. For instance, for grafting vinyltrimethoxysilane to polyethylene resin, using only 0.04 part per hundred resin (phr) of dicumyl peroxide with 4 phr silane results in grafting efficiencies as high as 70% [J. Morshedian, P. Mohammad Hoseinpour, H. Azizi, R. Parvizzad, *eXPRESS Polymer Letters*, Vol. 3, No. 2 (2009) 105-115].

Crosslinked Polymeric Composition

The crosslinking reaction typically takes place following the melt blending and shaping, molding, or extrusion step by peroxide decomposition at elevated temperature and moisture-induced reaction between the grafted or copolymerized silane groups. The moisture induced crosslinking can occur concurrently with peroxide crosslinking (for instance, in a vulcanization tube) or afterwards at elevated or ambient temperatures, with water permeating into the bulk polymer from the external environment (steam vulcanization tube, humid atmosphere or from a water bath or "sauna"). The water required for moisture-induced crosslinking may also be generated in situ at the elevated temperatures conventionally used for peroxide crosslinking, for instance, from cumyl alcohol (which is one of the by-products of dicumyl peroxide initiated crosslinking of polyethylene). Other approaches for in situ water generation for moisture induced crosslinking include (but are not limited to) those disclosed in U.S. Pat. No. 8,541,491 B2, U.S. Pat. No. 8,460,770 B2, U.S. Pat. No. 8,324,311 B2, European Patent No. EP 2 195 380 B 1, and European Patent No. EP 2 170 986 B 1. Thus, the moisture-induced crosslinking can even occur in a dry vulcanization tube that is conventionally used in making coated conductors with peroxide crosslinked polyolefins. The fabricated article (such as a coated conductor) can continue to crosslink at ambient or room conditions of temperature (such as 23° C.) and humidity (such as 50 to 70 percent relative humidity).

Various properties of the resulting crosslinkable or crosslinked polymeric composition can be determined via analysis on a moving die rheometer ("MDR") according to ASTM D5289. Upon analysis, an increase in torque, as indicated by the difference between the maximum torque ("MH") or final torque ("MF") and the minimum torque ("ML") ("MH–ML" or "MF–ML"), indicates greater degree of cross-linking at the test conditions of time and temperature. In various embodiments, the crosslinked polymeric composition can have an MH–ML at 182° C. or 200° C. of at least 0.2 dN·m, at least 0.3 dN·m, or at least 0.4 dN·m, with a practical upper limit of 20 dN·m. Furthermore, the crosslinked polymeric composition can have a scorch time (ts1, time for 1 lb-in increase in torque) at melt mixing conditions (140° C.) of at least 10 minutes, at least 11 minutes, or at least 12 minutes. Additionally, the crosslinked polymeric composition can have a gel content of at least 40%, at least 45%, or at least 50%, and up to 96% or 100%. Gel content is determined according to ASTM D2765.

Coated Conductor

A cable containing an insulation layer comprising the crosslinkable or crosslinked polymeric composition can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of 150 to 500° C., or in the range of 170 to 350° C. The heated zone can be heated by pressurized steam, or inductively heated pressurized nitrogen gas.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Polymer" means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), tetrapolymers (four different monomers), etc.

Test Methods

Density

Density is determined according to ASTM D 792.

Melt Index

Melt index, or $I_2$, is measured in accordance by ASTM D 1238, condition 190° C./2.16 kg, and is reported in grams eluted per 10 minutes. The $I_{10}$ is measured in accordance with ASTM D 1238, condition 190° C./10 kg, and is reported in grams eluted per 10 minutes.

Moving Die Rheometer

Moving Die Rheometer ("MDR") analyses are performed using an Alpha Technologies Rheometer MDR model 2000 unit. Testing is based on ASTM procedure D5289, "Standard Test Method for Rubber—Property Vulcanization Using Rotorless Cure Meters." The MDR analyses are performed using 6 grams of material. Samples (directly from the melt mixing step) are tested at 140° C., 182° C., or 200° C. for varying lengths of time at 0.5 degrees arc oscillation for all temperature conditions.

Gel Content

Gel content (insoluble fraction) produced by crosslinking is determined by extracting with the solvent decahydronaphthalene (Decalin) at boiling conditions for 6 hours according to ASTM D2765. The test is conducted on specimens that come out of the MDR analyses at 182° C. A WILEY mill is used (20-mesh screen) to prepare powdered specimens of at least one gram quantity which are subsequently enclosed in pouches of 120-mesh screens and immersed in boiling Decalin for 6 hours.

Materials

The following materials are employed in the Examples, below.

The low-density polyethylene ("LDPE") employed has a melt index ($I_2$) of 2.4 g/10 min., a density of 0.920 g/cm$^3$, and is produced by The Dow Chemical Company, Midland, Mich., USA.

SI-LINK™ A6451 is an ethylene-silane reactor copolymer, which is a copolymer of ethylene and vinyltrimethoxysilane ("VTMS") that is prepared with 1.5 wt % VTMS using a high-pressure reactor. SI-LINK™ A6451 has a density ranging from about 0.921 to about 0.923 g/cm$^3$, a melt index ($I_2$) ranging from about 1.30 to about 1.70 g/10 min., a moisture content upper limit of 0.010 wt % (ASTM D7191), and a fines content upper limit of 100 ppm. SI-LINK™ A6451 is commercially available from The Dow Chemical Company, Midland, Mich., USA.

The dicumyl peroxide ("DCP"), DiCUP™ R, is commercially available from Arkema, Inc., King of Prussia, Pa., USA.

NACURE™ B201 is a sulfonic acid produced by King Industries.

NACURE™ 5414 is a covalently blocked sulfonic acid produced by King Industries. NACURE™ 5414 is a 25% solution of covalently blocked dodecylbenzenesulfonic acid in an organic diluent (xylene).

NACURE™ 1419 is a covalently blocked sulfonic acid produced by King Industries. NACURE™ 1419 is a 30% solution of covalently blocked dinonylnaphthalenesulfonic acid in an organic diluent (a mixture of xylene and 4-methyl-2-pentanone, also known as methyl isobutyl ketone).

Dibutyltin dilaurate ("DBTDL") is commercially available from Sigma Aldrich, St. Louis, Mo., USA.

The CARBOWAX™ polyethylene glycol ("PEG") 400 is a low-molecular-weight polyethylene glycol having a molar mass typically between 380 to 420 g/mol. PEG 400 is commercially available from The Dow Chemical Company, Midland, Mich., USA.

4-Hydroxy TEMPO refers to 4-hydroxy-2,2,6,6-tetramethyl-1-piperidinyloxy and is commercially available from Sigma Aldrich, St. Louis, Mo., USA.

The vinyltriethoxysilane ("VTES") employed is SIL-QUEST™ A151, which is commercially available from Momentive Performance Materials, Columbus, Ohio, USA.

EXAMPLES

Example 1

Prepare Comparative Sample CS1 and Samples S1-S4 according to the formulations provided in Table 1, below. First, soak the peroxide into pellets of LDPE as follows:
Heat 196.6 grams of LDPE pellets in a glass jar at 60° C. for 2 hours;
Preheat dicumyl peroxide ("DCP") separately at 60° C. (i.e., above its melting point of 40° C.);
Add 3.4 grams of pre-heated peroxide to the heated LDPE using a syringe and tumble blend for 30 minutes at room temperature;
Place the jar back into the oven at 60° C. overnight;
Mix the entire contents of the jar (200 grams) in a 250-cm$^3$ Brabender mixing bowl at 125° C. and 30 rpm for 10 minutes.
Vinyltriethoxysilane ("VTES"), Nacure B201 sulfonic acid, and/or polyethylene glycol ("PEG") 400 are then added as follows:
Use a 40-cm$^3$ Brabender mixing bowl at 30 rpm to make 40 grams of the formulations;
Do not purge mixing bowl with nitrogen;
Add LDPE containing peroxide, and mix for 3 minutes at 125° C.;
Add VTES, sulfonic acid, and/or PEG, and mix for additional 3 minutes at 125° C.

The crosslinking kinetics of the compositions out of the 40-cm$^3$ mixing bowl are investigated using a Moving Die Rheometer ("MDR") at 140° C. (to simulate melt processing conditions where scorch is not desirable), at 182° C. (to simulate vulcanization conditions in which sufficient crosslinking is desirable), and 200° C. (to assess crosslinking at even higher temperature) using the procedure described in the Test Methods section, above. The results are presented in Table 1.

TABLE 1

Effects of Alkoxysilane Grafting, Sulfonic Acid and Polyethylene Glycol on Scorch and Cure Kinetics in Peroxide Crosslinking of Polyethylene

|  | CS1 | S1 | S2 | S3 | S4 |
|---|---|---|---|---|---|
| Composition (Weight Percent) | | | | | |
| LDPE containing 1.7 wt % DiCup R peroxide | 100.0 | 97.0 | 96.8 | 95.0 | 94.8 |
| A151 vinyltriethoxysilane (VTES) | | 3.0 | 3.0 | 3.0 | 3.0 |
| B201 sulfonic acid | | | 0.2 | | 0.2 |
| Polyethylene Glycol (PEG) 400 | | | | 2.0 | 2.0 |
| TOTAL | 100.0 | 100.0 | 100.0 | 100.0 | 100.0 |
| MDR: 140° C./90 min | | | | | |
| Min. Torque, ML (lb-in) | 0.30 | 0.30 | 0.25 | 0.25 | 0.23 |
| Final Torque, MF (lb-in) | 3.17 | 3.34 | 0.96 | 2.02 | 0.49 |
| MF − ML (lb-in) | 2.87 | 3.04 | 0.71 | 1.77 | 0.26 |
| tS1 (min) | 23.22 | 19.21 | >90 | 34.94 | >90 |
| tS2 (min) | 48.28 | 41.01 | >90 | N/A | >90 |
| MDR: 182° C./30 min | | | | | |
| Min. Torque, ML (lb-in) | 0.16 | 0.17 | 0.15 | 0.16 | 0.12 |
| Max. Torque, MH (lb-in) | 3.14 | 3.29 | 2.17 | 1.97 | 0.39 |
| MH − ML (lb-in) | 2.98 | 3.12 | 2.02 | 1.81 | 0.27 |
| tS1 (min) | 1.21 | 1.10 | 1.94 | 1.57 | N/A |
| tS2 (min) | 2.13 | 1.90 | 25.52 | N/A | N/A |
| t10 (min) | N/A | 0.71 | 0.65 | 0.62 | 0.59 |
| t50 (min) | N/A | 1.48 | 1.99 | 1.42 | 1.20 |
| t90 (min) | N/A | 3.64 | 12.23 | 3.87 | 13.35 |
| Gel content (%) | 96.60 | 96.05 | 87.96 | 87.53 | 61.01 |
| MDR: 200° C./12 minutes | | | | | |
| Min. Torque, ML (lb-in) | 0.17 | 0.16 | 0.16 | 0.13 | 0.10 |
| Max. Torque, MH (lb-in) | 2.86 | 2.69 | 2.57 | 1.54 | 0.39 |
| MH − ML (lb-in) | 2.69 | 2.53 | 2.41 | 1.41 | 0.29 |
| tS1 (min) | 0.58 | 0.64 | 0.61 | 0.81 | N/A |
| tS2 (min) | 0.86 | 0.94 | 4.32 | N/A | N/A |
| t10 (min) | N/A | 0.47 | 0.42 | 0.41 | N/A |
| t50 (min) | N/A | 0.70 | 0.68 | 0.64 | N/A |
| t90 (min) | N/A | 1.15 | 5.88 | 1.16 | N/A |

All of Samples S1-S4 yield the desired property balance of ts1 at 140° C., MH−ML at 182° C. and gel content, as well as only little or no loss in MH when the crosslinking temperature is raised to 200° C. Particularly useful results are obtained with Sample S2 (which contains the silanol condensation catalyst), as it not only results in very high value of ts1 at 140° C., but also yields a high degree of crosslinking (MH–ML) at the higher temperatures of 182° C. and 200° C. FIG. 1 shows the unusual crosslinking kinetics of Sample S2 at a temperature of 200° C.

Example 2

Prepare Samples S5-S9 according to the formulations provided in Table 2, below. First, soak the peroxide into pellets of SI-LINK™ A6451 ethylene-silane reactor copolymer employing the same procedure described in Example 1 using 196.6 grams of SI-LINK™ A6451 and 3.4 grams of DCP.

Nacure B201 sulfonic acid, 4-hydroxy TEMPO, and/or PEG 400 are then added as follows:
Use a 40-cm³ Brabender mixing bowl at 30 rpm to make 40 grams of the formulations;
Do not purge mixing bowl with nitrogen;
Add SI-LINK™ A6451 containing peroxide, and mix for 3 minutes at 125° C.;
Add sulfonic acid, 4-hydroxy TEMPO, and/or PEG 400, and mix for additional 3 minutes at 125° C.

The crosslinking kinetics of the compositions out of the 40-cm³ mixing bowl are investigated using an MDR at 140° C. (to simulate melt processing conditions where scorch is not desirable), at 182° C. (to simulate vulcanization conditions in which sufficient crosslinking is desirable), and 200° C. (to assess crosslinking at even higher temperature) using the procedure described in the Test Methods section, above. The results are presented in Table 2.

TABLE 2

Peroxide Crosslinking of Ethylene-Silane Copolymer and Effects of Sulfonic Acid, 4-Hydroxy Tempo and Polyethylene Glycol on Scorch and Cure Kinetics

| | S5 | S6 | S7 | S8 | S9 |
|---|---|---|---|---|---|
| Composition (Weight Percent) | | | | | |
| SI-LINK™ A6451 containing 1.7 wt % DiCup R peroxide | 100.0 | 99.8 | 99.0 | 98.8 | 96.8 |
| 4-hydroxy TEMPO | | | 1.0 | 1.0 | 1.0 |
| B201 sulfonic acid | | 0.2 | | 0.2 | 0.2 |
| Polyethylene Glycol (PEG) 400 | | | | | 2.0 |
| TOTAL | 100.0 | 100.0 | 100.0 | 100.0 | 100.0 |
| MDR: 140° C./90 min | | | | | |
| Min. Torque, ML (lb-in) | 0.34 | 0.82 | 0.30 | 0.38 | 0.38 |
| Final Torque, MF (lb-in) | 3.65 | 1.70 | 0.46 | 0.95 | 0.66 |
| MF – ML (lb-in) | 3.31 | 0.88 | 0.16 | 0.57 | 0.28 |
| ts0.16 (min) | 3.2 | 1.0 | 90.0 | 13.0 | 15.0 |
| ts0.55 (min) | 10.50 | 22.00 | >90 | 84.50 | >90 |
| ts0.7 (lb-in) | 12.80 | 39.00 | >90 | >90 | >90 |
| ts0.85 (min) | 15.50 | 77.00 | >90 | >90 | >90 |
| tS1 (min) | 17.78 | >90 | >90 | >90 | >90 |
| tS2 (min) | 38.80 | >90 | >90 | >90 | >90 |
| MDR: 182° C./30 min | | | | | |
| Min. Torque, ML (lb-in) | 0.26 | 0.46 | 0.19 | 0.21 | 0.20 |
| Max. Torque, MH (lb-in) | 3.76 | 2.40 | 1.73 | 1.08 | 0.56 |
| MH – ML (lb-in) | 3.50 | 1.94 | 1.54 | 0.87 | 0.36 |
| tS1 (min) | 1.02 | 5.83 | 3.11 | N/A | N/A |
| tS2 (min) | 1.71 | N/A | N/A | N/A | N/A |
| t10 (min) | 0.68 | 0.92 | 1.42 | N/A | 0.83 |
| t50 (min) | 1.51 | 5.54 | 2.51 | N/A | 2.21 |
| t90 (min) | 3.74 | 19.07 | 5.69 | N/A | 12.53 |
| Gels (%) - decalin, 120 mesh | 99.27 | 95.56 | 82.87 | 86.74 | 65.27 |
| MDR: 200° C./12 minutes | | | | | |
| Min. Torque, ML (lb-in) | 0.25 | 0.35 | 0.16 | 0.17 | 0.15 |
| Max. Torque, MH (lb-in) | 3.37 | 2.42 | 1.54 | 0.76 | 0.36 |
| MH – ML (lb-in) | 3.12 | 2.07 | 1.38 | 0.59 | 0.21 |
| tS1 (min) | 0.57 | 2.19 | 1.04 | N/A | N/A |
| tS2 (min) | 0.78 | 10.59 | N/A | N/A | N/A |
| t10 (min) | N/A | N/A | N/A | 0.71 | N/A |
| t50 (min) | N/A | N/A | N/A | 1.14 | N/A |
| t90 (min) | N/A | N/A | N/A | 4.90 | N/A |

Figure 2:
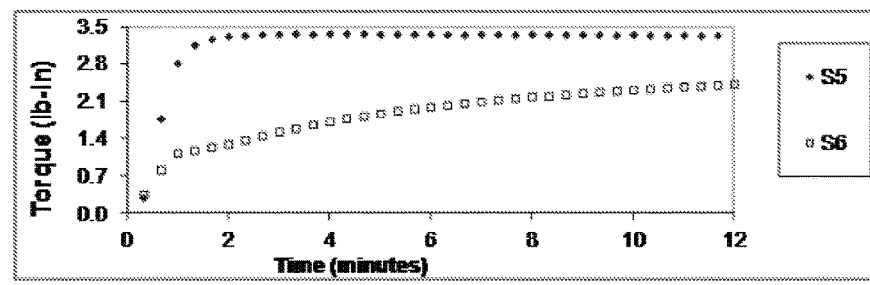
FIG. 2 is a plot of torque versus time for crosslinking of Samples S5 and S6 in an MDR at 200° C.

All of Samples S5-S9 yield the desired property balance of ts1 at 140° C., MH–ML at 182° C., and gel content, as well as only little or no loss in MH when the crosslinking temperature is raised to 200° C. Particularly useful results are obtained with Sample S6 (which contains the silanol condensation catalyst), as it not only results in a very high value of ts1 at 140° C., but also yields a high degree of crosslinking (MH–ML) at the higher temperatures of 182° C. and 200° C. FIG. 2 shows the unusual crosslinking kinetics of Sample S6 at a temperature of 200° C.

Example 3

Prepare Comparative Samples CS2-CS3 and Samples S10-S15 according to the formulations provided in Table 3, below. First, soak the peroxide into pellets of either LDPE or SI-LINK™ A6451 employing the same procedure described in Example 1 using 196.6 grams of polymer and 3.4 grams of DCP.

VTES, Nacure B201 sulfonic acid, 4-hydroxy TEMPO, and/or dibutyltin dilaurate ("DBTDL") are then added as follows:
Use a 40-cm³ Brabender mixing bowl at 30 rpm to make 40 grams of the formulations;
Do not purge mixing bowl with nitrogen;
Add polymer containing peroxide, and mix for 3 minutes at 125° C.;
Add sulfonic acid, 4-hydroxy TEMPO, and/or PEG 400, and mix for additional 3 minutes at 125° C.

The crosslinking kinetics of the compositions out of the 40-cm³ mixing bowl are investigated using an MDR at 140° C. (to simulate melt processing conditions where scorch is not desirable) and at 182° C. (to simulate vulcanization conditions in which sufficient crosslinking is desirable) using the procedure described in the Test Methods section, above. The results are presented in Table 3.

TABLE 3

Effects of Alkoxysilane Grafting and Sulfonic Acid on Scorch and Cure Kinetics in
Peroxide Crosslinking of Polyethylene, plus Peroxide Crosslinking of Ethylene-Silane
Copolymer and Effects of Moisture Cure Catalysts (Sulfonic Acid, DBTDL) and 4-Hydroxy
Tempo on Scorch and Cure Kinetics

|  | CS2 | CS3 | S10 | S11 | S12 | S13 | S14 | S15 |
|---|---|---|---|---|---|---|---|---|
| Composition (Weight Percent) | | | | | | | | |
| LDPE containing 1.7 wt % DiCup R peroxide | 100.00 | 99.975 | 98.975 | | | | | |
| SI-LINK™ A6451 containing 1.7 wt % DiCup R peroxide | | | | 100.00 | 99.975 | 99.80 | 99.775 | 99.775 |
| A151 vinyltriethoxysilane (VTES) | | | 1.00 | | | | | |
| B201 sulfonic acid | | 0.025 | 0.025 | | 0.025 | | 0.025 | 0.025 |
| 4-hydroxy TEMPO | | | | | | 0.20 | 0.20 | |
| Dibutyltin dilaurate (DBTDL) | | | | | | | | 0.20 |
| TOTAL | 100.0 | 100.0 | 100.0 | 100.0 | 100.0 | 100.0 | 100.0 | 100.0 |
| MDR: 140° C./90 min | | | | | | | | |
| Min. Torque, ML (lb-in) | 0.23 | 0.28 | 0.23 | 0.22 | 0.54 | 0.28 | 0.23 | 0.34 |
| Final Torque, MF (lb-in) | 3.23 | 1.87 | 3.08 | 3.29 | 2.70 | 2.99 | 3.05 | 3.36 |
| MF – ML (lb-in) | 3.00 | 1.59 | 2.85 | 3.07 | 2.16 | 2.71 | 2.82 | 3.02 |
| ts0.3 (min) | 6.60 | 18.00 | 9.00 | 5.40 | 10.00 | 16.40 | 13.25 | 3.00 |
| ts0.7 (min) | 13.60 | 36.00 | 17.60 | 12.80 | 22.70 | 25.20 | 21.50 | 10.60 |
| tS1 (min) | 18.68 | 49.15 | 23.28 | 18.02 | 31.91 | 31.55 | 27.81 | 15.31 |
| tS2 (min) | 42.10 | >90 | 49.04 | 41.49 | 77.13 | 59.12 | 53.67 | 37.02 |
| MDR: 182° C./30 min | | | | | | | | |
| Min. Torque, ML (lb-in) | 0.19 | 0.17 | 0.17 | 0.24 | 0.23 | 0.19 | 0.19 | 0.34 |
| Max. Torque, MH (lb-in) | 3.65 | 3.19 | 3.28 | 3.61 | 3.25 | 3.03 | 2.98 | 3.33 |
| MH – ML (lb-in) | 3.46 | 3.02 | 3.11 | 3.37 | 3.02 | 2.84 | 2.79 | 2.99 |
| tS1 (min) | 1.07 | 1.17 | 1.18 | 1.04 | 1.14 | 1.36 | 1.35 | 1.14 |
| tS2 (min) | 1.78 | 2.02 | 1.99 | 1.79 | 2.02 | 2.45 | 2.42 | 2.19 |
| t10 (min) | 0.71 | 0.74 | N/A | 0.67 | 0.72 | 0.85 | 0.85 | 0.72 |
| t50 (min) | 1.54 | 1.54 | N/A | 1.51 | 1.52 | 1.72 | 1.66 | 1.54 |
| t90 (min) | 3.82 | 3.53 | N/A | 3.89 | 3.66 | 4.06 | 3.83 | 7.22 |
| Gels (%) - decalin, 120 mesh | 88.92 | 85.54 | 85.54 | 90.81 | 90.15 | 87.45 | 58.09 | 91.07 |

Figure 3:
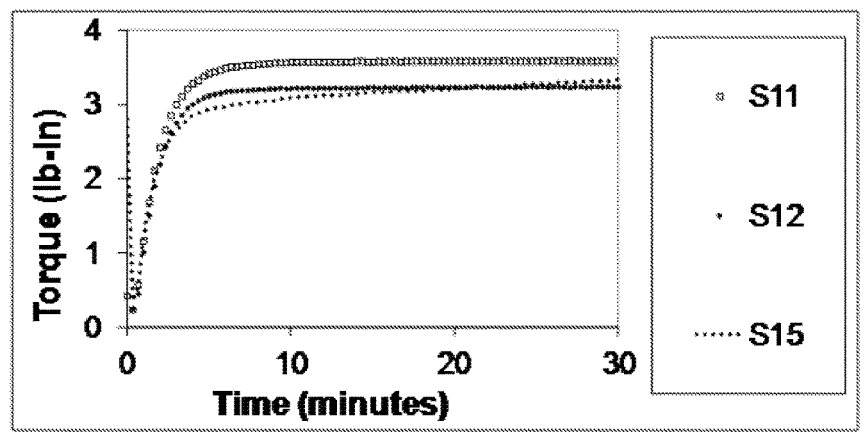
FIG. 3 is a plot of torque versus time for crosslinking of Samples S11, S12, and S15 in an MDR at 182° C.

All of Samples S10-S15 yield the desired property balance of ts1 at 140° C., MH–ML at 182° C., and gel content. Particularly useful results are obtained with Samples S12 and S15 (which contain the silanol condensation catalyst), as they not only result in acceptably high values of ts1 at 140° C., but also yield high degrees of crosslinking (MH–ML) at the higher temperature of 182° C. FIG. 3 shows the unusual crosslinking kinetics of Sample S15 at a temperature of 182° C.

Example 4

Prepare Comparative Sample CS4 and Samples S16-S21 according to the formulations provided in Table 4, below. First, soak the peroxide into pellets of either LDPE or SI-LINK™ A6451 employing the same procedure described in Example 1 using 196.6 grams of polymer and 3.4 grams of DCP.

VTES, Nacure B201 sulfonic acid, 4-hydroxy TEMPO, and/or dibutyltin dilaurate ("DBTDL") are then added as follows:

Use a 40-cm³ Brabender mixing bowl at 30 rpm to make 40 grams of the formulations;
Do not purge mixing bowl with nitrogen;
Add polymer containing peroxide, and mix for 3 minutes at 125° C.;
Add sulfonic acid, 4-hydroxy TEMPO, and/or PEG 400, and mix for additional 3 minutes at 125° C.

The crosslinking kinetics of the compositions out of the 40-cm³ mixing bowl are investigated using an MDR at 140° C. (to simulate melt processing conditions where scorch is not desirable) and at 182° C. (to simulate vulcanization conditions in which sufficient crosslinking is desirable) using the procedure described in the Test Methods section, above. The crosslinking kinetics of the samples are reevaluated after allowing the samples to age for 4 weeks at 23° C. and 50 percent relative humidity. The results are presented in Table 4.

TABLE 4

Effects of Alkoxysilane Grafting and Moisture Cure Catalysts (Blocked Sulfonic Acids) on Scorch and Cure Kinetics in Peroxide Crosslinking of Polyethylene, plus Peroxide Crosslinking of Ethylene-Silane Copolymer and Effects of Moisture Cure Catalysts (Blocked Sulfonic Acids) on Scorch and Cure Kinetics

|  | CS4 | S16 | S17 | S18 | S19 | S20 | S21 |
|---|---|---|---|---|---|---|---|
| Composition (Weight Percent) | | | | | | | |
| LDPE containing 1.7 wt % DiCup R peroxide | 100.00 | 97.00 | 96.20 | 96.20 | | | |
| SI-LINK ™ A6451 containing 1.7 wt % DiCup R peroxide | | | | | 100.00 | 99.200 | 99.200 |
| A151 vinyltriethoxysilane (VTES) | | 3.0 | 3.00 | 3.00 | | | |
| Nacure 5414 blocked sulfonic acid | | | 0.80 | | | 0.80 | |
| Nacure 1419 blocked sulfonic acid | | | | 0.80 | | | 0.80 |
| TOTAL (wt %) | 100.00 | 100.00 | 100.00 | 100.00 | 100.00 | 100.00 | 100.00 |
| MDR: 140° C./90 min | | | | | | | |
| Min. Torque, ML (lb-in) | 0.31 | 0.28 | 0.30 | 0.27 | 0.40 | 0.52 | 0.67 |
| Final Torque, MF (lb-in) | 3.07 | 3.29 | 2.39 | 1.75 | 3.50 | 4.76 | 2.99 |
| MF – ML (lb-in) | 2.76 | 3.01 | 2.09 | 1.48 | 3.10 | 4.24 | 2.32 |
| ts0.3 (min) | 9.41 | 7.73 | 7.28 | 8.99 | 6.11 | 4.47 | 3.55 |
| ts0.7 (min) | 15.87 | 13.15 | 13.57 | 20.47 | 11.91 | 9.34 | 9.86 |
| tS1 (min) | 21.22 | 17.48 | 19.71 | 35.01 | 16.54 | 13.53 | 15.95 |
| tS2 (min) | 47.28 | 38.63 | 62.79 | >90 | 38.38 | 32.11 | 58.37 |
| MDR: 182° C./30 min | | | | | | | |
| Min. Torque, ML (lb-in) | 0.20 | 0.18 | 0.19 | 0.19 | 0.29 | 0.33 | 0.56 |
| Max. Torque, MH (lb-in) | 3.05 | 3.23 | 4.05 | 2.57 | 3.40 | 4.97 | 3.78 |
| MH – ML (lb-in) | 2.85 | 3.05 | 3.86 | 2.38 | 3.11 | 4.64 | 3.22 |
| tS1 (min) | 1.22 | 1.11 | 1.14 | 1.27 | 1.13 | 1.23 | 1.15 |
| tS2 (min) | 1.97 | 1.76 | 1.99 | 16.60 | 1.79 | 3.11 | 2.32 |
| t10 (min) | 0.78 | 0.76 | 0.79 | 0.72 | 0.75 | 0.87 | 0.74 |
| t50 (min) | 1.46 | 1.40 | 1.91 | 1.49 | 1.44 | 6.11 | 1.68 |
| t90 (min) | 2.94 | 2.93 | 8.60 | 20.60 | 3.10 | 16.24 | 21.59 |
| Gels (%) - decalin, 120 mesh | 86.46 | 88.06 | 86.57 | 87.28 | 88.76 | 91.53 | 94.42 |
| MDR: 182° C./30 min - after 4 weeks at 23° C. and 50 percent relative humidity | | | | | | | |
| Min. Torque, ML (lb-in) | N/A | N/A | N/A | 0.20 | N/A | N/A | 0.97 |
| Max. Torque, MH (lb-in) | N/A | N/A | N/A | 1.82 | N/A | N/A | 4.23 |
| MH – ML (lb-in) | N/A | N/A | N/A | 1.62 | N/A | N/A | 3.26 |
| tS1 (min) | N/A | N/A | N/A | 1.47 | N/A | N/A | 0.86 |
| tS2 (min) | N/A | N/A | N/A | N/A | N/A | N/A | 1.59 |
| t10 (min) | N/A | N/A | N/A | 0.27 | N/A | N/A | 0.49 |
| t50 (min) | N/A | N/A | N/A | 1.27 | N/A | N/A | 1.24 |
| t90 (min) | N/A | N/A | N/A | 2.31 | N/A | N/A | 18.85 |

Figure 4:
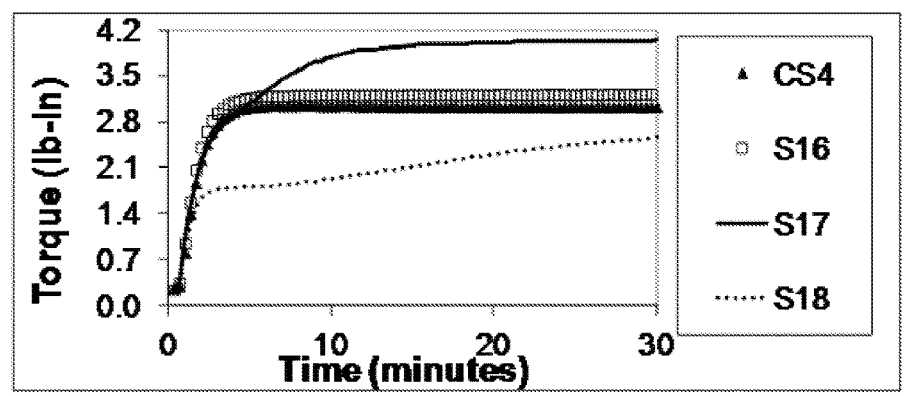
FIG. 4 is a plot of torque versus time for crosslinking of Comparative Sample CS4 and Samples S16, S17, and S18 in an MDR at 182° C.
Figure 5:
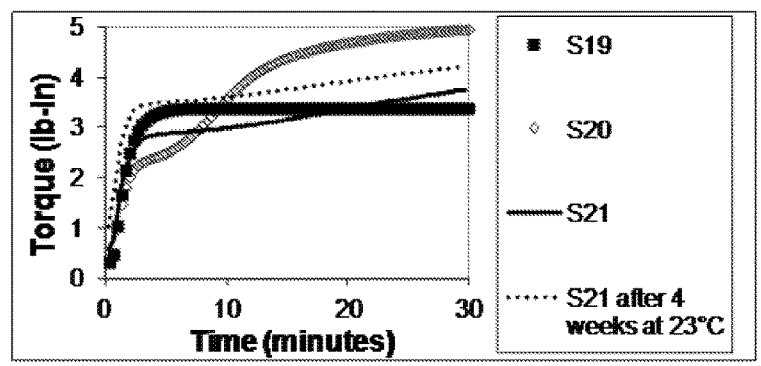
FIG. 5 is a plot of torque versus time for crosslinking of Samples S19, S20, S21, and S21 aged for four weeks at 23° C. with 50 percent relative humidity in an MDR at 182° C.

All of Samples S16-S21 yield the desired property balance of ts1 at 140° C., MH–ML at 182° C., and gel content. Additionally, only little or no loss in MH at 182° C. is observed when two of the compositions are aged for four weeks at 23° C. with 50 percent relative humidity, suggesting that very little (if any) of the peroxide is consumed by the blocked sulfonic acids. Particularly useful results are obtained with Samples S17, S18, S20, and S21 (which contain the silanol condensation catalyst), as they not only result in acceptably high values of ts1 at 140° C., but also yield high degrees of crosslinking (MH–ML) at the higher temperature of 182° C. FIGS. 4 and 5 show the unusual crosslinking kinetics of Samples S17, S18, S20, and S21 at a temperature of 182° C.

The invention claimed is:
1. A crosslinkable polymeric composition, comprising:
(a) a polyolefin having hydrolyzable silane groups;
(b) an organic peroxide; and
(c) a silanol condensation catalyst, which is a sulfonic acid or a blocked sulfonic acid;
wherein said polyolefin having hydrolyzable silane groups is present in an amount in the range of from 96 to 99.49 weight percent based on the entire weight of components (a) through (c); wherein said organic peroxide is present in an amount in the range of from 0.5 to 3 weight percent based on the entire weight of components (a) through (c); wherein said silanol condensation catalyst is present in an amount in the range of from 0.01 to 1 weight percent based on the entire weight of components (a) through (c); wherein said crosslinkable polymeric composition further comprises d) up to 5 parts per hundred of one or more additives selected from the group consisting of cure boosters, scorch retardants, tree retardants, heat and light stabilizers, fillers, pigments, and antioxidants, based on 100 weight parts of said polyolefin.

2. The crosslinkable polymeric composition of claim 1, wherein said polyolefin having hydrolyzable silane groups is selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, such interpolymer having a hydrolyzable silane grafted to its backbone.

3. A crosslinked polymeric composition prepared from the crosslinkable polymeric composition of claim 1, wherein said crosslinked polymeric composition has a scorch time at 140° C. of at least 10 minutes; wherein said crosslinked polymeric composition has a maximum torque (MH)—minimum torque (ML) at 182° C. of at least 0.2 lb-in; wherein said crosslinked polymeric composition has a gel content of at least 40 percent.

4. A coated conductor, comprising:
(a) a conductor; and
(b) at least a portion of said crosslinked polymeric composition of claim 3 surrounding at least a portion of said conductor.

5. A process for producing a crosslinked polymeric composition, said process comprising:
(1) forming a crosslinkable polymeric composition comprising (a) a polyolefin having hydrolyzable silane groups, (b) an organic peroxide, and (c) a silanol condensation catalyst, which is a sulfonic acid or a blocked sulfonic acid, wherein said polyolefin having hydrolyzable silane groups is present in an amount in the range of from 96 to 99.49 weight percent based on the entire weight of components (a) through (c); wherein said organic peroxide is present in an amount in the range of from 0.5 to 3 weight percent based on the entire weight of components (a) through (c); wherein said silanol condensation catalyst is present in an amount in the range of from 0.01 to 1 weight percent based on the entire weight of components (a) through (c); wherein said crosslinkable polymeric composition further comprises d) up to 5 parts per hundred of one or more additives selected from the group consisting of cure boosters, scorch retardants, tree retardants, heat and light stabilizers, fillers, pigments, and antioxidants, based on 100 weight parts of said polyolefin;
(2) subjecting said crosslinkable polymeric composition to conditions sufficient to induce crosslinking in at least a portion of said crosslinkable polymeric composition via said organic peroxide; and
(3) subjecting said crosslinkable polymeric composition to conditions sufficient to induce crosslinking in at least a portion of said crosslinkable polymeric composition via said hydrolyzable silane groups and said silanol condensation catalyst, thereby producing said crosslinked polymeric composition.

6. The process of claim 5, wherein said conditions sufficient to induce crosslinking via said organic peroxide include subjecting said crosslinkable polymeric composition to an elevated temperature of at least 90° C.

7. The process of claim 5, wherein said conditions sufficient to induce crosslinking via said hydrolyzable silane groups and said silanol condensation catalyst include contacting at least a portion of said crosslinkable polymeric composition with water, wherein said water is either generated in situ or provided from an external environment.

8. The process of claim 5, wherein said crosslinked polymeric composition has a scorch time at 140° C. of greater than 10 minutes; wherein said crosslinked polymeric composition has a maximum torque (MH) minimum torque (ML) at 182° C. of greater than 0.2 lb-in; wherein said crosslinked polymeric composition has a gel content of greater than 40 percent.

* * * * *